United States Patent
Kronrod et al.

(10) Patent No.: US 9,152,775 B1
(45) Date of Patent: Oct. 6, 2015

(54) QUESTION GENERATION IN KNOWLEDGE-BASED AUTHENTICATION FOR AN ENTERPRISE

(71) Applicant: EMC Corporation, Hopkinton, MA (US)

(72) Inventors: Boris Kronrod, Netania (IL); Ayelet Avni, Binyamina (IL); Lior Nudelman, Petach Tikva (IL); Oren Menes, Raanana (IL)

(73) Assignee: EMC Corporation, Hopkinton, MA (US)

( * ) Notice: Subject to any disclaimer, the term of this patent is extended or adjusted under 35 U.S.C. 154(b) by 449 days.

(21) Appl. No.: 13/628,732

(22) Filed: Sep. 27, 2012

(51) Int. Cl.
  *G06F 21/31* (2013.01)
  *G06N 5/00* (2006.01)
(52) U.S. Cl.
  CPC . *G06F 21/31* (2013.01); *G06N 5/00* (2013.01)
(58) Field of Classification Search
  None
  See application file for complete search history.

(56) References Cited

U.S. PATENT DOCUMENTS

| 7,752,167 | B1 | 7/2010 | Osborn | |
| 7,930,560 | B2 | 4/2011 | Saito et al. | |
| 8,387,122 | B2 | 2/2013 | Toomim et al. | |
| 2008/0288299 | A1* | 11/2008 | Schultz | 705/4 |
| 2010/0293608 | A1* | 11/2010 | Schechter et al. | 726/8 |
| 2012/0216260 | A1* | 8/2012 | Crawford et al. | 726/5 |
| 2013/0198822 | A1* | 8/2013 | Hitchcock et al. | 726/6 |

* cited by examiner

*Primary Examiner* — Kakali Chaki
*Assistant Examiner* — Michael Zidanic
(74) *Attorney, Agent, or Firm* — BainwoodHuang

(57) ABSTRACT

An improved technique involves generating KBA questions from facts obtained from a personal information management (PIM) server under the control of an organization. Along these lines, such an organization acquires facts from documents such as emails, meeting notices, presentations, and spreadsheets that are stored on a PIM server such as a Microsoft® Exchange server or IBM Lotus® Domino server. A KBA server then generates KBA questions from the acquired facts and stores the KBA questions on a question server. In some arrangements, the KBA server filters out KBA questions based on the nature of the facts from which the KBA questions were derived. The remaining KBA questions are ranked based on historical question data; the KBA server provides the most highly ranked KBA questions to a user claiming to be a member of the organization.

19 Claims, 5 Drawing Sheets

QUESTION GENERATION IN KNOWLEDGE-BASED AUTHENTICATION FOR AN ENTERPRISE

BACKGROUND

Conventional knowledge-based authentication (KBA) involves deriving questions regarding a particular user from facts in a publicly available database, and asking that user one or more of the derived questions to verify the authenticity of the user. For example, conventional KBA accesses facts such as addresses, mortgage payments, and driving records from a LexisNexis® server, a credit bureau or a motor vehicle registry.

Suppose that a user wishes to make a purchase at a store using a store account. In conventional KBA, the store may ask the user a set of questions derived from a set of facts concerning the user in order to complete the purchase. Such questions may include "when were you married?", "what was the make and model of your first car?", and "what was the name of your first pet?". If the user answers the questions correctly, the store completes the purchase. On the other hand, if the user answers questions incorrectly, the store may take remedial steps to verify the authenticity of the user. For example, the store may ask for further proof of identity such as a driver's license.

SUMMARY

Unfortunately, there are deficiencies with the above-described conventional KBA. For example, facts obtained from a publicly available database may be known by members of the public. Consequently, KBA questions derived from such facts may be insecure because an imposter may have examined facts relevant to a particular legitimate user.

Further, it should be understood that a common purpose of providing KBA questions is to authenticate users within an organization. For example, suppose that an employee of a corporation wishes to access sensitive files stored in a database under the control of the corporation. In using conventional KBA to authenticate the employee, the corporation has little control over the security of the KBA questions because the corporation does not control the source of the facts.

In contrast to conventional KBA in which an organization may be unsure about the security of KBA questions due to the possibility of an imposter gaining access to facts used to derive the KBA questions, an improved technique involves generating KBA questions from facts obtained from a personal information management (PIM) server under the control of an organization. Along these lines, such an organization acquires facts from documents such as emails, meeting notices, presentations, and spreadsheets that are stored on a PIM server such as a Microsoft® Exchange server or IBM Lotus® Domino server. A KBA server then generates KBA questions from the acquired facts and stores the KBA questions on a question server. In some arrangements, the KBA server filters out KBA questions based on the nature of the facts from which the KBA questions were derived. The remaining KBA questions are ranked based on historical question data; the KBA server provides the most highly ranked KBA questions to a user claiming to be a member of the organization.

For example, suppose that the KBA server obtains emails from a Microsoft® Exchange server for generating KBA questions. The KBA server may filter out questions derived from emails that have more than two recipients because the number of people that know the subject matter of the facts extracted from such an email is large enough to pose a risk of an imposter being able to answer KBA questions derived from such facts. Further, the KBA server may rank KBA questions that have not been previously asked higher than those that have been previously asked. In such a scenario, the KBA server may only present new questions rather than questions that have a history.

Advantageously, the improved technique allows an organization to be confident in the security of the KBA questions used to authenticate users attempting to access resources belonging to the organization. The PIM servers from which facts used to derive KBA questions are not available to the public because the information stored on the PIM servers is confidential. Consequently, an organization may have control over the security of the KBA questions because the source of facts for those questions is under the control of the organization.

One embodiment of the improved technique is directed to a method of performing KBA. The method includes obtaining a set of user facts from a personal information management (PIM) server that is under the control of an organization, each user fact of the set of user facts including a reference to a user identifier of a user that is a member of the organization. The method also includes generating a set of KBA questions from the set of user facts. The method further includes providing selected KBA questions of the set of KBA questions to a person that has submitted a request to access resources of the organization, the request including the user identifier.

Additionally, some embodiments of the improved technique are directed to a system constructed and arranged to perform KBA. The system includes a network interface, memory, and a controller including controlling circuitry constructed and arranged to carry out the method of performing KBA.

Furthermore, some embodiments of the improved technique are directed to a computer program product having a non-transitory computer readable storage medium which stores code including a set of instructions to carry the method of performing KBA.

BRIEF DESCRIPTION OF THE DRAWING

The foregoing and other objects, features and advantages will be apparent from the following description of particular embodiments of the invention, as illustrated in the accompanying figures in which like reference characters refer to the same parts throughout the different views.

DETAILED DESCRIPTION

An improved technique involves generating KBA questions from facts obtained from a personal information management (PIM) server under the control of an organization.

Along these lines, such an organization acquires facts from documents such as emails, meeting notices, presentations, and spreadsheets that are stored on a PIM server such as a Microsoft® Exchange server or IBM Lotus® Domino server. A KBA server then generates KBA questions from the acquired facts and stores the KBA questions on a question server. In some arrangements, the KBA server filters out KBA questions based on the nature of the facts from which the KBA questions were derived. The remaining KBA questions are ranked based on historical question data; the KBA server also provides the most highly ranked KBA questions to a user claiming to be a member of the organization.

Advantageously, the improved technique allows an organization to be confident in the security of the KBA questions used to authenticate users attempting to access resources belonging to the organization. The PIM servers from which facts used to derive KBA questions are not available to the public because the information stored on the PIM servers is confidential. Consequently, an organization may have control over the security of the KBA questions because the source of facts for those questions is under the control of the organization.

Figure 1:
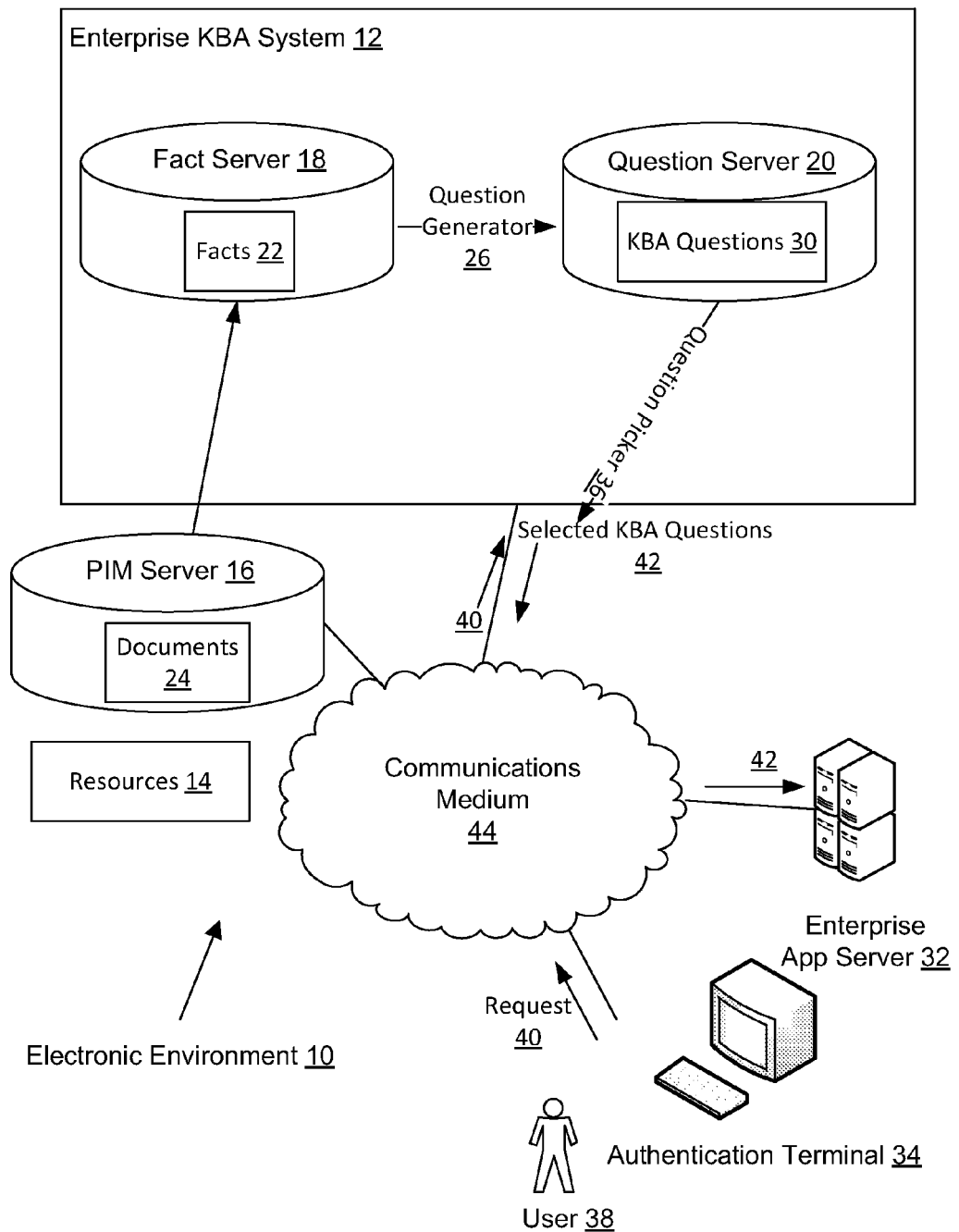
FIG. 1 is a block diagram illustrating an example electronic environment for carrying out the improved technique.

FIG. 1 illustrates an example electronic environment 10 for carrying out the improved technique. Electronic environment 10 includes enterprise KBA system 12, personal information management (PIM) server 16, enterprise app server 32, authentication terminal 34, and communications medium 44.

Communication medium 44 provides network connections between enterprise KBA system 12, personal information management (PIM) server 16, enterprise app server 32, and authentication terminal 34. Communications medium 44 may implement a variety of protocols such as TCP/IP, UDP, ATM, Ethernet, Fibre Channel, combinations thereof, and the like. Furthermore, communications media 44 may include various components (e.g., cables, switches/routers, gateways/bridges, NAS/SAN appliances/nodes, interfaces, etc.). Moreover, the communications medium 44 are capable of having a variety of topologies (e.g., queue manager-and-spoke, ring, backbone, multi drop, point to-point, irregular, combinations thereof, and so on).

PIM server 16 stores applications and data concerning personal information including email, calendar, and shared documents for members of an enterprise. For example, the enterprise may be a corporation whose members are employees. Data stored in PIM server 16 takes the form of various documents 24 such as email messages, meeting notices, and documents on which members have collaborated.

Enterprise KBA system 12 obtains facts 22 from PIM server 14, stores facts 22 on fact server 18, generates KBA questions 30 from facts 22, and provides selected KBA questions 42 to authentication terminal 34 via enterprise app server 32. KBA system 12 includes a fact server 18, a question server 20, a question generator 26, and a question picker 36.

Fact server 18 is an electronic system in communication with question generator 26. Fact server 18 acquires facts 22 from PIM server 16 and stores facts 22 within a fact database 74 (see FIG. 2). In some arrangements, fact server 18 generates facts 22 from documents 24 stored on PIM server 16.

Question generator 26 is an electronic system in communication with fact server 18 and question server 20 that generates KBA questions 30 from facts 22. In some arrangements, question generator 26 computes a generation score for a generated KBA question based on facts 22 in order to determine whether to send the KBA question to question server 20.

Question server 20 is an electronic system in communication with question generator 26 and question picker 36. Question server 20 stores KBA questions 30 and sends KBA questions 30 to question picker 36 for question selection.

Question picker 36 is an electronic system in communication with question server 20. Question picker 36 selects questions 42 from KBA questions 30 stored on KBA server 20 based on certain criteria. For example, question picker 36 filters out KBA questions 30 that have already been provided to users such as user 38. In some arrangements, question server 18 is also in communication with external systems such as enterprise app server 32. Question picker 36 may also in communication with authentication terminal 34 at which a service representative provides questions 42 to user 38.

Enterprise app server 26 provides an application programming interface (API) for providing questions to user 38.

Authentication terminal 34 receives questions from enterprise app server 32 and presents them to user 38, in some cases through a service representative. In some arrangements, authentication terminal 32 is a Netview terminal.

During operation, enterprise KBA (eKBA) system 12 extracts a set of facts 22 from documents 24 stored on PIM server 16. In some arrangements, eKBA system 12 performs the extraction on a periodic basis, e.g., a nightly run. In other arrangements, however, eKBA system performs the extraction in response to an event.

It should be understood that, as a consequence of facts 22 being derived from documents 24 stored on PIM server 16, each fact 22 includes a reference to at least one user identifier of a member of the organization that controls PIM server 16. In this way, facts 22 are, in many cases, expressions of a relationship between members of the organization. For example, one fact, derived from an email, states that "Member A sent Member B an email on Day C at Time D."

In some arrangements, eKBA system 12 extracts a single fact from an aggregation of documents 24. For example, suppose that Member B sent Member A ten emails over a two-week period. eKBA system 12 would then lump these emails into a single, aggregate fact such as "Member B sent Member A ten emails between Day C and Day D."

eKBA system 12 then generates KBA questions 30 from extracted facts 22 using question generator 26. In some arrangements, question generator 26 generates KBA questions 30 in a similar manner as that known from question generation from publicly available facts. In this way, for each member of the organization, eKBA system 12 stores a set of KBA questions 30 on question server 20. In other arrangements, however, question generator 26 scores a particular KBA question 30 based on facts 22 from which the particular KBA question 30 was derived. Such a score may determine whether the particular KBA question 30 will be included in the set of KBA questions 30 stored on question server 20. Further details of the role of question generator 26 in such scoring of KBA questions 30 will be provided below with respect to FIG. 3.

User 38 sends, to eKBA system 12, a request 40 to access resources 14. Request 40 includes a user identifier associated with a member of the organization.

Upon receipt of request 40, eKBA system 12 provides user 38 with selected KBA questions 42 from KBA questions 30 stored on question server 20. In some arrangements, eKBA system 12 uses question picker 36 to provide a ranking of KBA questions 30 and selects the highest-ranked questions to user 38. Further details of question picker 36 will be provided below with respect to FIG. 4.

User 38 provides eKBA system 12 with answers (not pictured) to selected KBA questions 42, and based on the answers, eKBA system 12 authenticates user 38.

Further details concerning eKBA system 12 will be discussed below with respect to FIG. 2.

Figure 2:
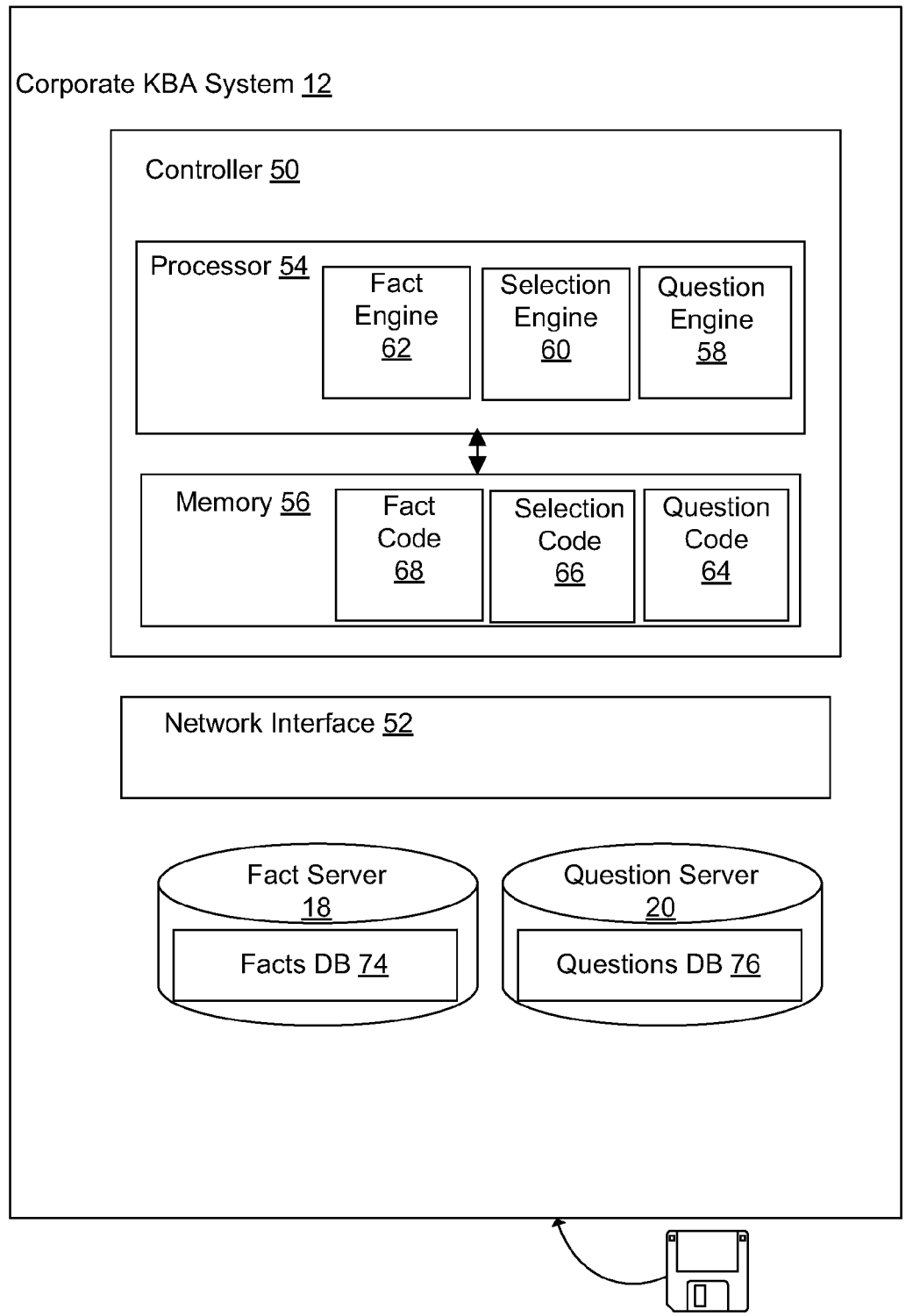
FIG. 2 is a block diagram illustrating an example enterprise KBA system within the electronic environment shown in FIG. 1.

FIG. 2 illustrates further details of eKBA system 12. eKBA system 12 includes controller 50, which in turn includes processor 54 and memory 56; network interface 52; fact server 18 on which facts database 74 is stored, and question server 20 on which questions database 76 is stored.

Network interface 52 takes the form of an Ethernet card; in some arrangements, network interface 52 takes other forms including a wireless receiver and a token ring card.

Memory 56 is configured to store code which includes question code 64 configured to generate a set of KBA questions 30 from facts 22 (see FIG. 1) stored in facts database 74 on storage device 70. KBA questions 30, in turn, are stored in questions database 76 on storage device 72. Memory 50 is also configured to store selection code 66 for selecting KBA questions to send to user 38 (see FIG. 1), as well as fact code 68 for extracting facts 22 from documents 24 (see FIG. 1). Memory 50 generally takes the form of, e.g., random access memory, flash memory or a non-volatile memory.

Processor 54 takes the form of, but is not limited to, Intel or AMD-based MPUs, and can include a single or multi-cores each running single or multiple threads. Processor 48 is coupled to memory 56 and is configured to execute instructions from question code 64, selection code 66, and fact code 68. Processor 48 includes question engine 58, fact engine 62, and selection engine 60.

During operation, processor 54 accesses documents 24 (see FIG. 1) over network interface 52. For example, PIM server 16 may include a database (not pictured) on which documents 24 are stored. Processor 54 would then perform lookup operations on the database to find documents 24 that had been stored in the database since the previous lookup operation.

Fact engine 62 forms facts 22 from documents 24 accessed on PIM server 16. Along these lines, fact engine 62 parses documents 24 for particular keywords, such as user identifiers, fact type identifiers such as "meeting," and dates and times. Fact engine then forms facts 22 by storing values of attributes defined by fact type identifiers in facts database 74. In some arrangements, facts database 74 stores fact scores associated with the attribute values.

Question engine 58 derives KBA questions 30 from facts 22 and stores derived KBA questions 30 in question database 76. In some arrangements, question engine 58 causes question generator 26 (see FIG. 1) to use the fact scores stored in facts database 74 to filter KBA questions 30 derived from facts 22 stored in facts database 74. Further details of such filtering will be discussed below with respect to FIG. 3.

Figure 3:
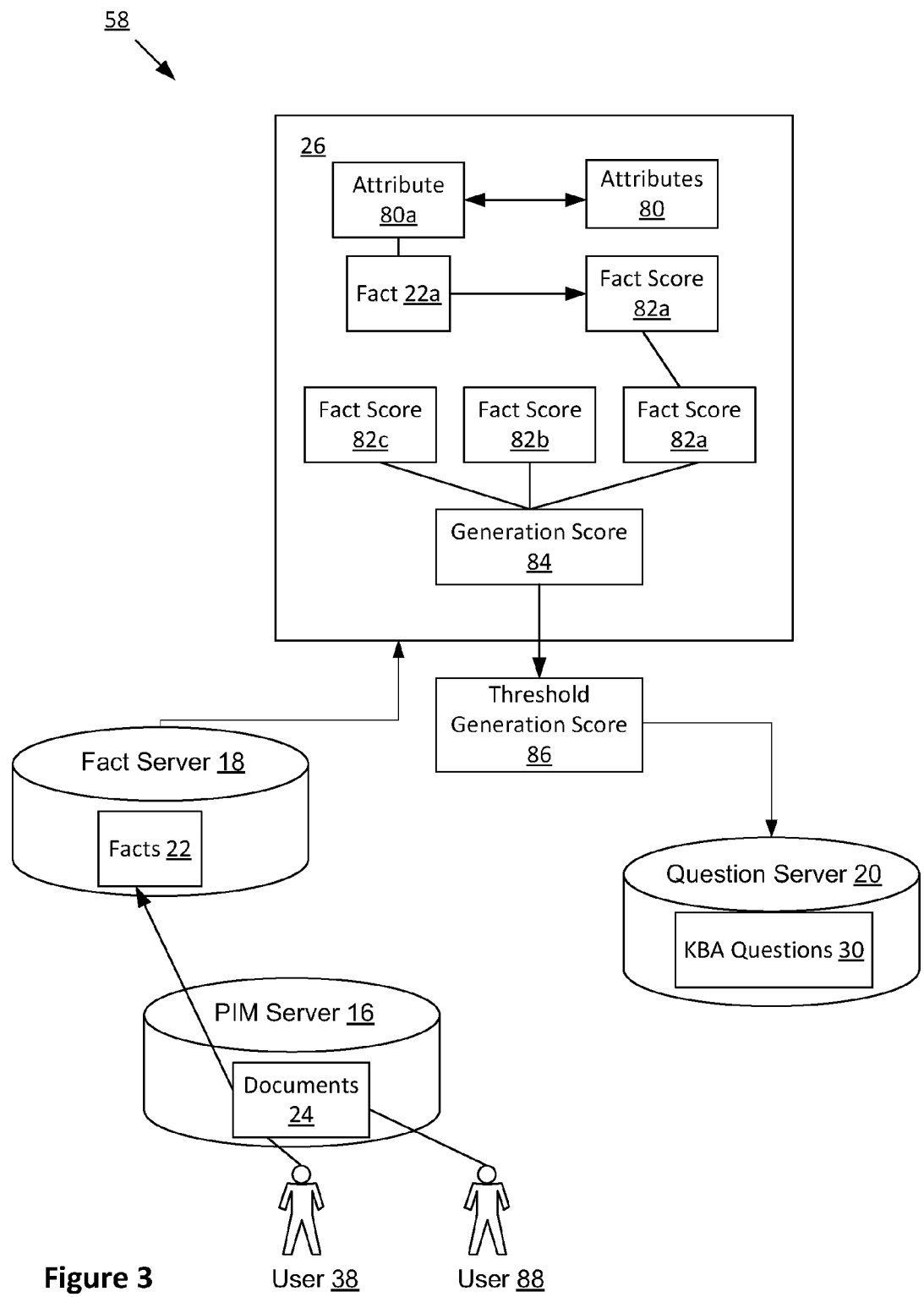
FIG. 3 is a block diagram illustrating an example question generator within the example enterprise KBA system shown in FIG. 2.

FIG. 3 illustrates further detail of an example of how question engine 58 and question generator 26 filter KBA questions generated from facts 22. Documents 24 accessed by fact engine 62 (see FIG. 2) have references to user 38 (see FIG. 1) and another user 88. Consequently, facts 22 may express a relationship between user 38 and user 88; for example, a fact 22a may take the form "user 88 sent an email to user 38 between Day A and Day B."

Question engine 58 then engages question generator 26 to compute a generation score 84 that determines whether a question derived from fact 22a will be stored in question server 76 (see FIG. 2) on question server 20. Along these lines, question generator 26 includes a predetermined set of attributes 80 from which an attribute 80a of a fact 22a is associated with a fact score 82a.

Question generator 26 matches an attribute 80a of fact 22a to an attribute stored in the set of predetermined attributes 80. For example, an attribute 80a of fact 22a may be that the email from which fact 22a was extracted included only a single recipient. Question generator 26 matches such an attribute 80a to an attribute in the set 80 and determines a fact score 82a from the match. It should be understood that a given fact may have more than one attribute; each attribute 80a, 80b, and 80c would then have corresponding fact scores 82a, 82b, and 82c. Moreover, a KBA question 30 may be derived from more than one fact; question generator 26 derives fact scores for each attribute of each fact.

Question generator 26 then combines fact scores 82a, 82b, and 82c into a question generation score 84 that corresponds to a KBA question 30 derived from fact 22a having attributes 80a, 80b, and 80c. For example, question generator 26 may add scores 82a, 82b, and 82c to form generation score 84.

Question generator 26 compares generation score 84 to a threshold generation score 86. If generation score 84 is greater than threshold generation score 86, then question generator 26 stores KBA question 30 derived from fact 22a in question database 76 on question server 20. Alternatively, if generation score 84 is greater than threshold generation score 86, then question generator 26 does not store KBA question 30 in question database 76.

Referring back to FIG. 2, at some later point in time, processor 54 receives via network interface 52 request 40 (see FIG. 1) to access resources 14 (see FIG. 1). As request 40 includes a user identifier, processor 54 accesses KBA questions 30 stored in question database 74 that were derived from facts 22 having a reference to the user identifier. Selection engine 60 then applies selection criteria to select KBA questions 30 from question database 76. Such a selection process is described below with respect to FIG. 4.

Figure 4:
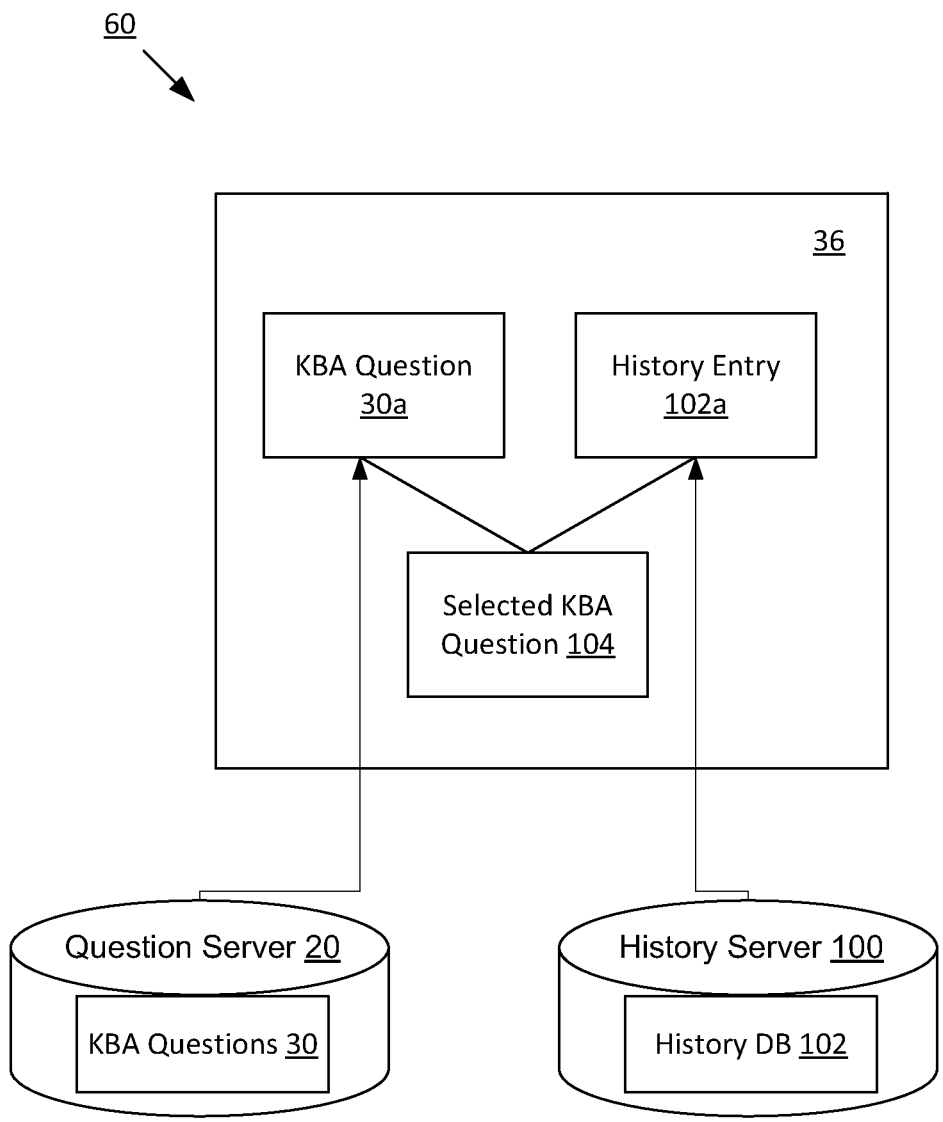
FIG. 4 is a block diagram illustrating an example question picker within the example enterprise KBA system shown in FIG. 2.

FIG. 4 illustrates a selection of KBA questions for presentation to user 38 (see FIG. 1). Selection engine 60 engages question picker 36 to select KBA questions 30. Question picker 36 is configured to access a history database 102 stored on history server 100.

History database 102 includes information concerning previous questions that were presented to users. In some arrangements, history database also includes responses to these questions from the users. History database 102 may take the form of a RDBMS, but also may be a NoSQL database.

Question picker 36 accesses KBA questions 30 from question database 76 (see FIG. 2) that are associated with the user identifier. For each KBA question 30, question picker 36 performs a query operation on history database 102 to match that KBA question 30 with an entry on history database 102. In some arrangements, question picker 36 is able to match questions that do not have the exact same wording, but are semantically equivalent.

Based on whether there is a match between the KBA question 30 and an entry of history database 102, and if so, when an equivalent previous question was presented, question picker 36 assigns a ranking value to the KBA question 30. For example, a KBA question for which no entry was found in history database 102 may have a high ranking value, while another KBA question 30 for which a matched question was recently presented may have a low ranking value.

Question picker 36 selects the KBA questions having the largest ranking values as selected KBA questions 104 and presents the selected KBA questions to user 38.

Figure 5:
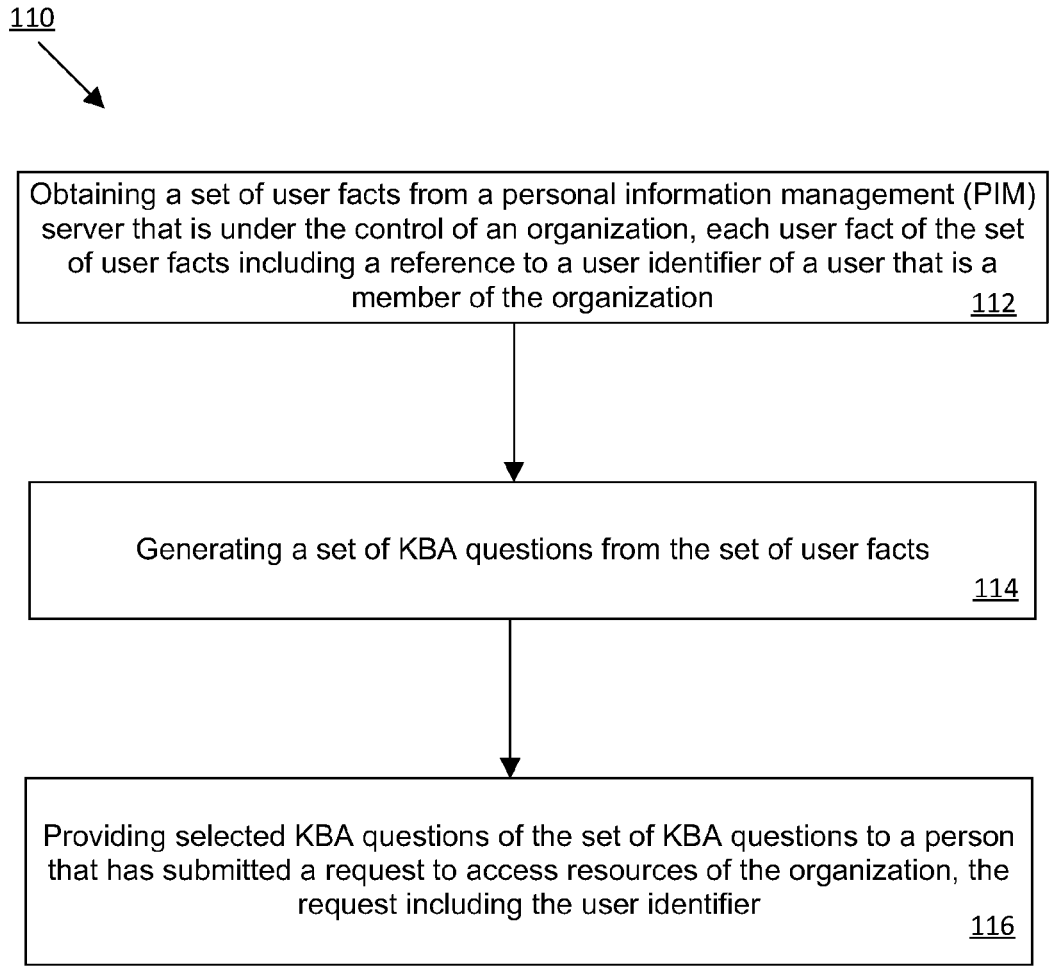
FIG. 5 is a flow chart illustrating a method of carrying out the improved technique within the electronic environment shown in FIG. 1.

FIG. 5 illustrates a method 110 of performing KBA. In step 112, a set of user facts are obtained from a personal information management (PIM) server that is under the control of an organization, each user fact of the set of user facts including a reference to a user identifier of a user that is a member of the organization. In step 114, a set of KBA questions are generated from the set of user facts. In step 116, selected KBA questions of the set of KBA questions are provided to a person that has submitted a request to access resources of the organization, the request including the user identifier.

While various embodiments of the invention have been particularly shown and described, it will be understood by those skilled in the art that various changes in form and details may be made therein without departing from the spirit and scope of the invention as defined by the appended claims.

For example, history database 102 is a special case of a type of policy server. Such a policy server stores policies that provide rules for selecting KBA questions 30 from question database 76. Another example of a policy server would provide rules questions derived from multiple fact sources (e.g., human resources, travel, etc.).

Furthermore, it should be understood that some embodiments are directed to eKBA system 12, which is constructed and arranged to perform KBA. Some embodiments are directed to a process of performing KBA. Also, some embodiments are directed to a computer program product which enables computer logic to perform KBA.

In some arrangements, eKBA system 12 is implemented by a set of processors or other types of control/processing circuitry running software. In such arrangements, the software instructions can be delivered, within eKBA system 12, respectively (see FIG. 2), in the form of a computer program product 120, each computer program product having a computer readable storage medium which stores the instructions in a non-volatile manner. Alternative examples of suitable computer readable storage media include tangible articles of manufacture and apparatus such as CD-ROM, flash memory, disk memory, tape memory, and the like.

What is claimed is:

1. A method of performing knowledge-based authentication (KBA), the method comprising:
obtaining a set of user facts from a personal information management (PIM) server that is under the control of an organization, each user fact of the set of user facts including a reference to a user identifier of a user that is a member of the organization;
generating a set of KBA questions from the set of user facts; and
providing selected KBA questions of the set of KBA questions to a person that has submitted a request to access resources of the organization, the request including the user identifier;
wherein generating the set of KBA questions from the set of user facts includes:
for each KBA question of the set of KBA questions:
producing a generation score that is based on the facts of the set of facts from which the KBA question was generated,
removing the KBA question from the set of KBA questions when the generation score is less than a threshold generation score, and
keeping the KBA question in the set of KBA questions when the generation score is greater than the threshold generation score.

2. A method as in claim 1,
wherein producing the generation score includes:
for each fact of the set of facts:
matching an attribute of the fact to an attribute of a predetermined set of attributes, and
assigning a fact score to the fact based on the attribute; and combining fact scores assigned to facts of the set of facts.

3. A method as in claim 2,
wherein obtaining the set of facts from the PIM server includes:
finding a set of documents on the PIM server having a reference to the user identifier and a reference to another user identifier, and
forming, as a fact of the set of facts, an aggregate fact from the set of documents;
wherein generating the set of KBA questions from the set of user facts includes:
generating a KBA question of the set of KBA questions from the aggregate fact.

4. A method as in claim 3,
wherein an attribute of the predetermined set of attributes is the number of documents of the set of documents from which the aggregate fact of the set of facts was formed; and
wherein combining the fact scores assigned to the facts of the set of facts includes:
weighting the aggregate fact by the number of documents of the set of documents from which the aggregate fact of the set of facts was formed.

5. A method as in claim 3,
wherein the PIM server includes an email server that accesses an email database, the email database including a set of emails, each email of the set of emails including a header and a body, the header including references to user identifiers, the body including a message; and
wherein obtaining the set of facts from the PIM server includes:
parsing the header and the body of an email of the set of emails to form, as a fact of the set of facts, a relationship between user identifiers, references to which are included in the header.

6. A method as in claim 5,
wherein an attribute of the set of attributes is a number of user identifiers in the header of an email from which a fact of the set of facts was formed;
wherein assigning the fact score to the fact based on the attribute includes:
generating a fact score based on the number of user identifiers in the header of the email, the fact score decreasing with an increasing number of user identifiers in the header of the email and increasing with a decreasing number of user identifiers in the header of the email.

7. A method as in claim 1,
wherein providing the selected KBA questions of the set of KBA questions includes:
obtaining a set of policies from a policy server; and
selecting the selected KBA questions from the set of KBA questions based on the policy.

8. A method as in claim 7,
wherein a policy of the set of policies includes a rule concerning an amount of time within which a KBA question of the selected KBA questions that was provided to another person is not to be provided to the person;
wherein selecting the selected KBA questions includes:
not including a KBA question of the set of KBA questions in the selected KBA questions when the KBA question was provided to the other person within the amount of time, and including the KBA question in the selected KBA questions when the KBA question was provided to the other person outside of the amount of time.

9. A method as in claim 8,
wherein a policy of the set of policies assigns weights of a set of weights to KBA questions of the set of KBA questions;
wherein selecting the selected KBA questions includes:
  choosing, as the selected KBA questions, a predetermined number of KBA questions to which weights having the largest values are assigned.

10. An electronic system constructed and arranged to perform KBA, the electronic system comprising:
a network interface;
memory; and
a controller including controlling circuitry coupled to the memory, the controlling circuitry being constructed and arranged to:
  obtain a set of user facts from a personal information management (PIM) server that is under the control of an organization, each user fact of the set of user facts including a reference to a user identifier of a user that is a member of the organization;
  generate a set of KBA questions from the set of user facts; and
  provide selected KBA questions of the set of KBA questions to a person that has submitted a request to access resources of the organization, the request including the user identifier;
wherein the controlling circuitry constructed and arranged to generate the set of KBA questions from the set of user facts is further constructed and arranged to:
  for each KBA question of the set of KBA questions:
    produce a generation score that is based on the facts of the set of facts from which the KBA question was generated,
    remove the KBA question from the set of KBA questions when the generation score is less than a threshold generation score, and
    keep the KBA question in the set of KBA questions when the generation score is greater than the threshold generation score.

11. An electronic system as in claim 10,
wherein the controlling circuitry constructed and arranged to produce the generation score is further constructed and arranged to:
  for each fact of the set of facts:
    match an attribute of the fact to an attribute of a predetermined set of attributes, and
    assign a fact score to the fact based on the attribute; and
  combine fact scores assigned to facts of the set of facts.

12. An electronic system as in claim 11,
wherein the controlling circuitry constructed and arranged to obtain the set of facts from the PIM server is further constructed and arranged to:
  find a set of documents on the PIM server having a reference to the user identifier and a reference to another user identifier, and
  form, as a fact of the set of facts, an aggregate fact from the set of documents;
wherein generating the set of KBA questions from the set of user facts includes:
  generate a KBA question of the set of KBA questions from the aggregate fact.

13. An electronic system as in claim 12,
wherein an attribute of the predetermined set of attributes is the number of documents of the set of documents from which the aggregate fact of the set of facts was formed; and
wherein the controlling circuitry constructed and arranged to combine the fact scores assigned to the facts of the set of facts is further constructed and arranged to:
  weight the aggregate fact by the number of documents of the set of documents from which the aggregate fact of the set of facts was formed.

14. A computer program product having a non-transitory, computer-readable storage medium which stores code to perform KBA, the code including instructions to:
  obtain a set of user facts from a personal information management (PIM) server that is under the control of an organization, each user fact of the set of user facts including a reference to a user identifier of a user that is a member of the organization;
  generate a set of KBA questions from the set of user facts; and
  provide selected KBA questions of the set of KBA questions to a person that has submitted a request to access resources of the organization, the request including the user identifier;
wherein generating the set of KBA questions from the set of user facts includes:
  for each KBA question of the set of KBA questions:
    producing a generation score that is based on the facts of the set of facts from which the KBA question was generated,
    removing the KBA question from the set of KBA questions when the generation score is less than a threshold generation score, and
    keeping the KBA question in the set of KBA questions when the generation score is greater than the threshold generation score.

15. An computer program product as in claim 14,
wherein producing the generation score includes:
  for each fact of the set of facts:
    matching an attribute of the fact to an attribute of a predetermined set of attributes, and
    assigning a fact score to the fact based on the attribute; and
  combining fact scores assigned to facts of the set of facts.

16. An computer program product as in claim 15,
wherein obtaining the set of facts from the PIM server includes:
  finding a set of documents on the PIM server having a reference to the user identifier and a reference to another user identifier, and
  forming, as a fact of the set of facts, an aggregate fact from the set of documents;
wherein generating the set of KBA questions from the set of user facts includes:
  generating a KBA question of the set of KBA questions from the aggregate fact.

17. An computer program product as in claim 16,
wherein an attribute of the predetermined set of attributes is the number of documents of the set of documents from which the aggregate fact of the set of facts was formed; and
wherein combining the fact scores assigned to the facts of the set of facts includes:
  weighting the aggregate fact by the number of documents of the set of documents from which the aggregate fact of the set of facts was formed.

18. A method as in claim 1, further comprising providing a respective ranking value to each KBA question of the set of KBA questions; and
  wherein providing the selected questions to the person that has submitted the request includes selecting a number of KBA questions of the set of KBA questions having a respective ranking value greater than a threshold.

19. A method as in claim 18, wherein a history database stores another set of KBA questions; and
  wherein providing the respective ranking value to each KBA question of the set of KBA questions includes:
    performing a query operation on the history database and a KBA question of the set of KBA questions, the query operation being constructed and arranged to provide one of (i) a first matching result indicating the KBA question is not semantically equivalent to any question stored in the history database and (ii) a second matching result indicating the KBA question is semantically equivalent to at least one question stored in the history database;
    providing a first ranking value to a first KBA question of the set of KBA questions when the query operation on the history database and the first KBA question results in the first matching result; and
    providing a second ranking value to a second KBA question of the set of KBA questions when the query operation on the history database and the second KBA question results in the second matching result, the second ranking value being less than the first ranking value.

* * * * *